(12) United States Patent
Chambard et al.

(10) Patent No.: US 7,672,485 B2
(45) Date of Patent: Mar. 2, 2010

(54) METHOD AND DEVICE FOR MEASURING AT LEAST A GEOMETRIC QUANTITY OF AN OPTICALLY REFLECTING SURFACE

(75) Inventors: Jean-Pierre Chambard, Pfastatt (FR); Vincent Chalvidan, Saint-Louis (FR)

(73) Assignee: HOLO 3, Saint-Louis (FR)

( * ) Notice: Subject to any disclaimer, the term of this patent is extended or adjusted under 35 U.S.C. 154(b) by 1225 days.

(21) Appl. No.: 10/490,469

(22) PCT Filed: Sep. 26, 2002

(86) PCT No.: PCT/FR02/03297

§ 371 (c)(1),
(2), (4) Date: Mar. 23, 2004

(87) PCT Pub. No.: WO03/036230

PCT Pub. Date: May 1, 2003

(65) Prior Publication Data

US 2004/0246497 A1 Dec. 9, 2004

(30) Foreign Application Priority Data

Sep. 26, 2001 (FR) .................................. 01 12618

(51) Int. Cl.
*G06K 9/00* (2006.01)
*H04N 7/18* (2006.01)
*G01N 21/00* (2006.01)
*G01B 11/24* (2006.01)

(52) U.S. Cl. .................... 382/108; 382/141; 348/128; 348/131; 356/612; 356/237.2

(58) Field of Classification Search ............... 382/106, 382/108; 356/601, 603, 604, 612, 613; 348/86, 348/92, 125, 128, 131
See application file for complete search history.

(56) References Cited

U.S. PATENT DOCUMENTS

| 2,707,415 | A | * | 5/1955 | Rooney, Jr. ................ 356/446 |
| 2,867,149 | A | * | 1/1959 | Goddard .................... 356/605 |
| 3,614,237 | A | * | 10/1971 | Kyle et al. .................. 356/605 |
| 4,126,395 | A | * | 11/1978 | Ross et al. .................. 356/613 |
| 4,291,990 | A | * | 9/1981 | Takasu ....................... 356/445 |
| 4,585,947 | A | * | 4/1986 | Liptay-Wagner et al. ................... 250/559.06 |
| 4,634,278 | A | * | 1/1987 | Ross et al. .................. 356/610 |

(Continued)

OTHER PUBLICATIONS

Robert J. Woodham, "Determining Surface Curvature with Photometric Stereo," May 14-19, 1989, IEEE International Proceedings on Robotics and Automation, vol. 1, pp. 36-42.*

(Continued)

*Primary Examiner*—Bhavesh M Mehta
*Assistant Examiner*—Anthony MacKowey
(74) *Attorney, Agent, or Firm*—Davis & Bujold, P.L.L.C.

(57) ABSTRACT

A quick, reliable and accurate method and device for measuring an optically reflecting surface, enabling quantifying of the curvatures and/or slopes and raised parts of the optically reflecting surface without risk of deteriorating the measured surface and adapted to measurement of large-dimension surfaces. The system and method for measuring the geometry of an optically reflecting surface to be measured S includes observing with a camera (2) the image of the surface to be measured S set in a measuring space (1), then interpreting the image in quantitative values characterizing at least one geometric quantity of the optically reflecting surface to be measured S.

18 Claims, 5 Drawing Sheets

U.S. PATENT DOCUMENTS

| | | | |
|---|---|---|---|
| 4,641,972 A * | 2/1987 | Halioua et al. | 356/604 |
| 4,645,348 A | 2/1987 | Dewar et al. | |
| 4,668,094 A * | 5/1987 | Matsumoto et al. | 356/603 |
| 4,742,237 A | 5/1988 | Ozawa | |
| 4,802,759 A * | 2/1989 | Matsumoto et al. | 356/603 |
| 4,895,448 A * | 1/1990 | Laird | 356/603 |
| 4,929,846 A * | 5/1990 | Mansour | 250/559.07 |
| 5,078,496 A * | 1/1992 | Parker et al. | 356/613 |
| 5,085,502 A * | 2/1992 | Womack et al. | 356/605 |
| 5,122,672 A * | 6/1992 | Mansour | 250/559.01 |
| 5,130,555 A * | 7/1992 | Suzuki et al. | 250/559.07 |
| 5,142,648 A * | 8/1992 | Fitts et al. | 382/108 |
| 5,155,558 A * | 10/1992 | Tannenbaum et al. | 356/446 |
| 5,237,404 A * | 8/1993 | Tanaka et al. | 348/128 |
| 5,289,264 A * | 2/1994 | Steinbichler | 356/605 |
| 5,309,222 A * | 5/1994 | Kamei et al. | 356/613 |
| 5,361,308 A * | 11/1994 | Lee et al. | 382/204 |
| 5,367,378 A * | 11/1994 | Harding et al. | 356/613 |
| 5,471,307 A * | 11/1995 | Koliopoulos et al. | 356/613 |
| 5,477,332 A * | 12/1995 | Stone et al. | 356/613 |
| 5,495,429 A * | 2/1996 | Craven et al. | 702/127 |
| 5,537,494 A * | 7/1996 | Toh | 382/242 |
| 5,568,258 A * | 10/1996 | Uemura et al. | 356/237.1 |
| 5,570,186 A * | 10/1996 | Satzger et al. | 356/613 |
| 5,631,171 A * | 5/1997 | Sandstrom et al. | 436/518 |
| 5,636,024 A * | 6/1997 | Crookham et al. | 356/613 |
| 5,808,735 A * | 9/1998 | Lee et al. | 356/237.2 |
| 5,912,738 A * | 6/1999 | Chason et al. | 356/601 |
| 5,974,168 A * | 10/1999 | Rushmeier et al. | 382/141 |
| 6,064,759 A * | 5/2000 | Buckley et al. | 382/154 |
| 6,100,990 A * | 8/2000 | Ladewski | 356/445 |
| 6,144,453 A * | 11/2000 | Hallerman et al. | 356/616 |
| 6,286,349 B1* | 9/2001 | Muller et al. | 72/11.7 |
| 6,320,654 B1* | 11/2001 | Alders et al. | 356/237.2 |
| 6,392,754 B1* | 5/2002 | Pingel et al. | 356/603 |
| 6,510,244 B2* | 1/2003 | Proesmans et al. | 382/203 |
| 6,532,066 B1* | 3/2003 | Filev et al. | 356/237.2 |
| 7,023,559 B1* | 4/2006 | Coulombe et al. | 356/511 |
| 2001/0021898 A1 | 9/2001 | Greer et al. | |
| 2002/0057438 A1* | 5/2002 | Decker | 356/601 |
| 2003/0038933 A1* | 2/2003 | Shirley et al. | 356/243.1 |
| 2006/0050284 A1* | 3/2006 | Bertin-Mourot et al. | 356/612 |

OTHER PUBLICATIONS

Holfling et al. "Phase reflection—a new solution for the detection of shape defects on car body sheets", Jan. 2000, SPIE, Optical Engineering, vol. 39 No. 1, pp. 175-182.*

Vincent J. Parks, "Surface Curvature Analyzed with a Grid-reflection Technique", Experimental Mechanics Mar. 1984.

* cited by examiner

METHOD AND DEVICE FOR MEASURING AT LEAST A GEOMETRIC QUANTITY OF AN OPTICALLY REFLECTING SURFACE

This application is a National Stage Application of PCT/FR02/03297 which claims priority from FR01/12618 filed on Sep. 26, 2001.

FIELD OF THE INVENTION

This invention pertains to a process and a device for measuring at least one geometric magnitude of an optically reflective surface.

BACKGROUND OF THE INVENTION

There are a number of procedures and devices by which one can observe the geometry of surfaces in general.

One of these procedures, particularly suitable for applications in the automotive and aeronautic industries, consists of using an optical device with a camera directed toward the surface to be observed, this camera being connected to a computer and generating an image in shades of gray, showing variations in the surface's curvature. Devices of this kind are marketed, for example, under the trademarks DIFFRACTO® and ONDULO®, and are generally used for optically reflective surfaces, permitting qualitative readings by means of images in shades of gray. In this way, these devices can be used to visualize slight variations in slope or curvature by using the principle of specular reflection, but they do not permit quantitative readings of geometrical magnitudes of these variations. Therefore, it is impossible to know the value of the slopes or curvatures of the optically reflective surfaces.

Other known procedures make it possible to measure geometric magnitudes of these optically reflective surfaces.

A first procedure consists of using a mechanical feeler that moves in relation to the optically reflective surface to be measured. This mechanical feeler is calibrated so that one or more geometric magnitudes of the surface can be made to correspond to each displacement of its measuring finger. At the time of measurement, the finger of the mechanical feeler generally follows a predetermined path to sweep the entire surface. In this way, it is possible to measure the geometric magnitude(s) of the path followed according to the axis of the mechanical feeler. The greatest disadvantages of this procedure are the time needed to measure the surface, the lack of precision resulting from the limited number of measuring points, and finally the risks of surface damage from contact with the finger of the mechanical feeler.

A second known procedure uses the techniques of interferometry. This procedure compares two waves from the same laser, one reflected by the surface to be measured, and the other a reference coming directly from the laser. Like the previous procedure, the latter is suitable for measuring small surfaces. However, for measuring large surfaces such as mirrors, windshields, and others, this process is particularly expensive and time-consuming. In addition, this process is appropriate only for perfect optically reflective surfaces, which does not describe the panels of automobile bodies, for example.

Therefore, existing procedures do not permit a rapid and precise measurement of large optically reflective surfaces.

SUMMARY OF THE INVENTION

This invention aims to remedy these disadvantages by offering a procedure and a measuring device to measure at least one geometric magnitude of an optically reflective surface; this device is rapid, reliable, and precise, and with it one can quantify the curves and/or slopes and reliefs of the optically reflective surface without risk of damaging the surface to be measured; in addition, it is suitable for measuring large-sized optically reflective surfaces.

To this end, the invention concerns a procedure as defined above, in which a camera is used to view the image of the optically reflective surface to be measured S, characterized in that this procedure involves at least one calibration phase and at least one measurement phase, and in that the calibration phase is accomplished to permit interpretation of the image of the surface to be measured S viewed by the camera during the measuring phase, and thereby to transform this image into quantitative values characterizing at least one geometric magnitude of the optically reflective surface to be measured S.

To carry out the phases of calibration and measurement, it is advantageous to define a measurement space associated with an orthonormed reference mark O, X, Y, Z. In this measuring space, there is at least one optically reflective reference surface P, Ci, or surface to be measured S. The camera is disposed so that its field of view covers the measuring space, and an image can be visualized in association with a plane reference mark O', X', Y'. There is also a test image associated with a plane reference mark O", X", Y" and having reference points M"i so that its reference points M"i reflecting on said reference surface P, Ci or surface to be measured S or in points Mi, with the camera one can observe the viewed points M'i image of the reference points M"i after reflection on the reference surface P, Ci or surface to be measured S at points Mi, and a single correspondence is established between the viewed points M'i and the reference points M"i.

Preferably, the calibration phase includes a flat calibration step, in which a single correspondence is established between the coordinates x', y' of the viewed points M'i and the coordinates x, y of the points Mi, of which the coordinate according to the axis Z is known.

In a first embodiment, the calibration phase includes a curved calibration step for which a camera is available, so that its field of view is oblique to the reference surface Ci, the test image is situated opposite the camera in relation to the reference surface Ci, and the camera is focused essentially at the level of the reference surface Ci.

It is particularly advantageous to use as a reference surface at least one standard curve Ci having at least one known curve/Ri along one of the axes X, Y, to observe with the camera the viewed points M'i image of the reference points M"i of the test image after reflection on the standard curve Ci at points Mi, and to establish a single correspondence between the values measured at viewed points M'i or their variations and the curve 1/Ri of the standard curve Ci. In one embodiment variation, the test image includes an intensity code Ii and/or color code that varies from one point to another of the test image surface, this variation being defined by a known function along at least one axis X",Y" of the test image, and with the camera we can observe the viewed points M'i image of the reference points M"i of the test image after reflection on the standard curve Ci at points Mi, and we establish a single correspondence between the intensity I'i measured and or the color measured or their variation at the viewed points M'i and the curve 1/Ri of the standard curve Ci.

It is preferable to shift the standard curve Ci forming the reference surface in different positions of the measuring space, and we repeat the observation of the image viewed by the camera and the establishment of the single correspondence in a number of points Mi determined as a function of the desired precision for said single correspondence. We can then use several standard curves Ci each having a different 1/Ri curve.

In a first mode of embodiment, to accomplish the curve measuring phase, the optically reflective surface to be measured S is advantageously placed in the space to be measured, and with the camera we observed the viewed points M'i image of the reference points M"i of the test image after reflection on the surface to be measured S at points Mi, and from it we deduce the curve 1/Ri at points Mi as a function of the laws of single correspondence from the calibration phase.

In a second mode of embodiment, the calibration phase includes a step of calibration in slope for which we have the test image essentially opposite the measuring space and the camera such that its optical center is essentially disposed in the vicinity of the test image, and as a reference surface we use at least one reference plane P that is essentially parallel to the test image, and with a known coordinate along axis Z.

To accomplish the calibration phase in slope, it is preferable to use as a reference plane P an essentially flat mirror with coordinates zi along the axis Z; with the camera we observe the viewed points M'i image of the reference points M"i after reflection on the reference surface P at points Mi, and we establish the single correspondence between the coordinates x', y' of the viewed points M'i and the coordinates x, y of the points Mi of which the coordinate along axis Z is known.

It is advantageous to shift the mirror forming the reference plane P parallel to itself in different coordinates zi of the measuring space, and we repeat the observation of the image viewed with the camera and establishment of the single correspondence.

In an embodiment variant, the test image includes a coding of intensities Iix, Iiy and/or of colors varying from one point to another of its surface, these variations being defined by known functions along axes X" and Y", respectively, of the test image. With the camera, we observe the viewed points M'i image of the reference points M"i after reflection on the mirror at points Mi, and we establish single correspondences between the measured intensities I'ix, I'iy on the one hand, and/or the colors measured or their variations at the viewed points M'i, and the coordinate zi of the reference plane P, and on the other hand the coordinates xi, yi of point Mi.

In the second mode of embodiment, to accomplish the sloped measuring phase, we place the optically reflective surface to be measured S in the measuring space, and with the camera we observe the viewed points M'i image of the reference points M"i of the test image after reflection on the surface to be measured S at points Mi. From this, we deduce the coordinates xi, yi, zi at points Mi as a function of the laws of single correspondence from the calibration phase, and from it we deduce the slopes Pix, Piy of the axes X and Y, respectively between two nearby points Mi.

The invention also concerns a device to implement the procedure for measuring at least one geometric magnitude of an optically reflective surface to be measured S as defined above, characterized in that it comprises at least one measuring space in which we place at least one reference surface P, Ci, or surface to be measured S, at least one reference surface P, Ci designed to calibrate said device, at least one test image positioned to reflect on said reference surface P, Ci or surface to be measured S, at least one camera positioned so that its field of view covers the measuring space and sees the image of the test image on said reference surface P, Ci or surface to be measured S, the camera being associated with a computer system that can interpret the image of the surface to be measured S seen by the camera and to deduce from it the quantitative values characterizing at least one geometric magnitude of the surface to be measured S as a function of at least one reference surface P, Ci.

BRIEF DESCRIPTION OF THE DRAWINGS

This invention and its advantages will become more apparent from the following description of embodiment examples, with reference to the attached figures in which.

DETAILED DESCRIPTION

With reference to the figures, the invention concerns a process and a device whereby metric data can be used to quantify at least one geometric magnitude of an optically reflective surface to be measured S.

During this process, a camera 2 is used to view the image of an optically reflective surface to be measured S disposed in a measuring space 1.

Figure 1:
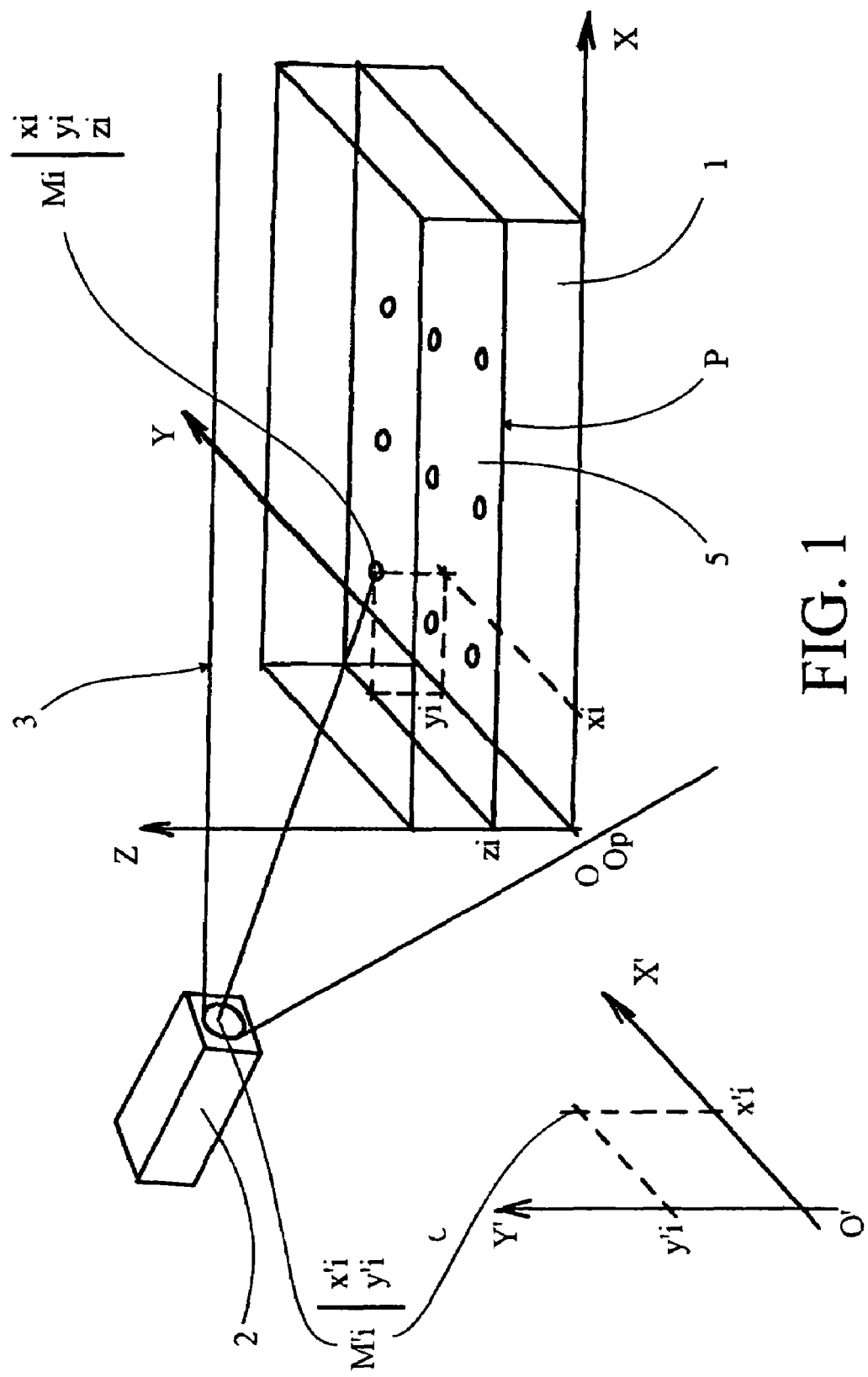
FIG. 1 schematically represents the measuring device according to the invention in an orthonormed spatial reference mark O, X, Y, Z, FIG. 2 schematically represents the configuration of the measuring device to accomplish the curved calibration phase.

The measuring space 1 illustrated by FIG. 1 is previously defined. It is associated with an orthonormed spatial reference mark O, X, Y, Z originating from O of axes X, Y, Z. In this measuring space 1, there is an optically reflective or reference surface P, Ci, or a measuring surface S, and a camera 2 such that its field of view 3 covers the space to be measured 1. This camera 2 can be used to visualize an image that is associated with a plane reference mark O', X', Y'.

This process includes at least one calibration phase and one measuring phase. During the measuring phase, the calibration phase makes it possible to interpret the image of the surface to be measured S viewed by the camera 2 and to transform this image into quantitative values characterizing one or more geometric magnitudes of the surface to be measured S.

To accomplish the calibration phase, we use a test image 6, 10 associated with a plane reference mark O", X", Y" and having reference points M"i such that these reference points M"i are reflected on the reference surface P, Ci at points Mi, and we observe the viewed points M'i image of the points Mi. We then establish a single correspondence between the viewed points M'i and the reference points M"i, the nature of these single correspondences depending on the method used.

In fact, it is possible to accomplish this calibration phase by two different methods, for one permitting a measure of the curves and for the other, a measure of the slopes. These two calibration methods and the corresponding measuring phases are detailed below.

Figure 2:
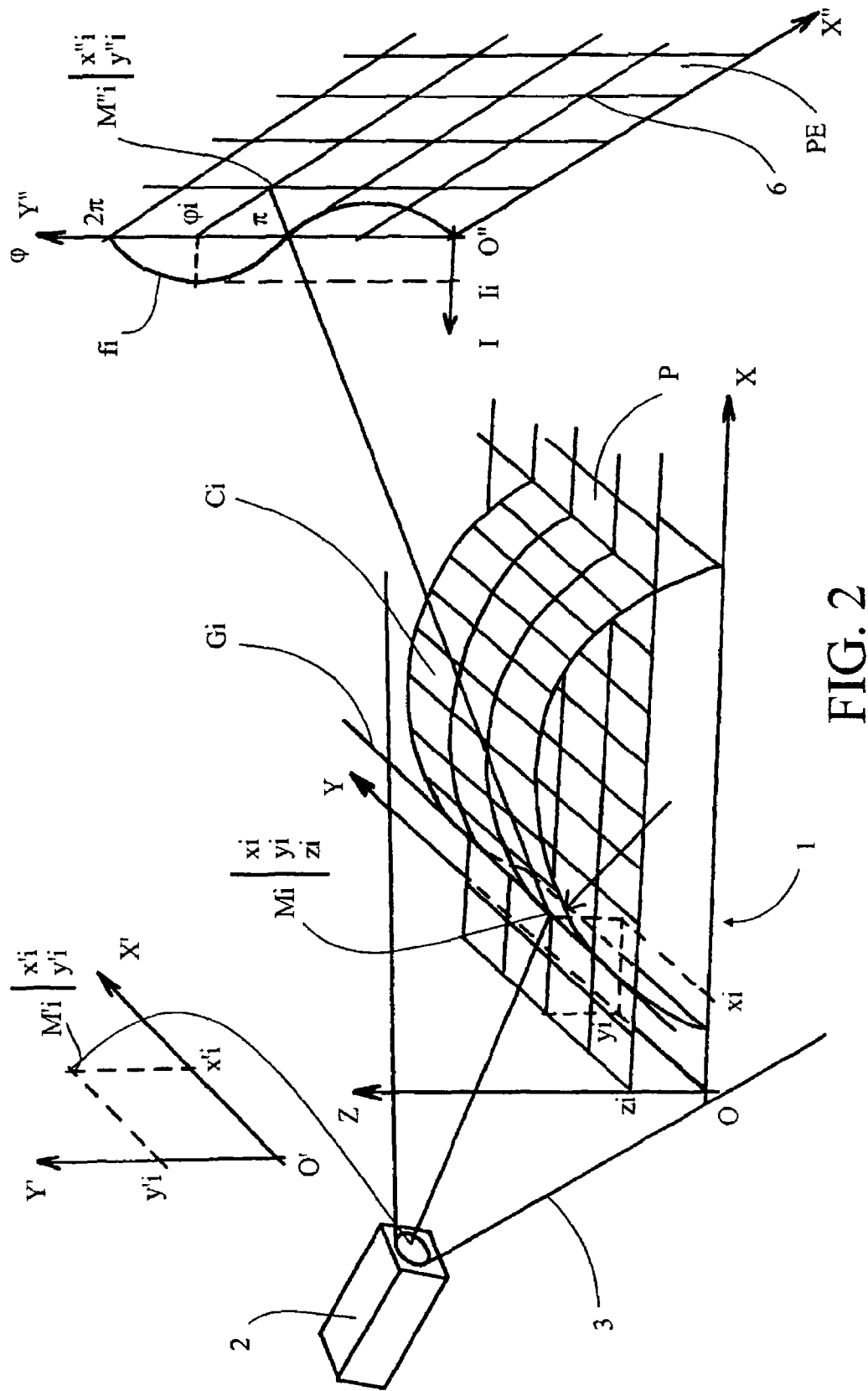

In a first method of calibration in curvature that is particularly well suited to record locally the curves 1/Ri and particularly to detect any defect of curvature, the camera 2 is oriented as illustrated in FIG. 2 so that its field of view 3 is oblique with respect to the reference surface P, Ci. We have a test image 6 such that it is situated opposite the camera 2 with respect to the reference surface P, Ci and so that the camera 2 sees the image of the test image on this reference surface P. Ci.

The method of calibration in curvature may comprise an optional step of calibration of the plane. This step, illustrated by FIG. 1, consists of calibration of a reference plane P having coordinate points $x_i$, $y_i$ in the spatial reference mark O, X, Y, Z of which the coordinate $z_i$ along axis Z is known. This optional step will make it possible, if necessary, to know, in addition to the curvature $1/R_i$ at a point $M_i$, its coordinates $x_i$, $y_i$ as well. Depending on the field of application, the knowledge of these coordinates $x_i$, $y_i$ may or may not be necessary.

In order to carry out this optional step of calibration of the plan, we place essentially in the reference plane P a test image 5 made up of any surface that can provide a single correspondence between one of its points $M_i$ and the viewed point $M'_i$ corresponding to its image. This single correspondence is established, for example, by means of a pattern at known dimensional parameters. This pattern may be made up, for example, of one or more networks of lines forming a grid, for example. This pattern may also be made up as illustrated in FIG. 1 by a network of points or any other pattern made visible on the surface of the test image 5 by a known marking or engraving process such as printing, chemical etching, etc. It is also possible to use a test image 5 having a pattern of which the dimensional parameters are not known at the start, and for which a previous operation is carried out to determine these dimensional parameters for any known measuring process.

With the camera 2 we visualize the viewed points $M'_i$, images of the points $M_i$ of the test image 5 essentially merged with the reference plane P. We process this image in such a way as to define the coordinates $x'_i$, $y'_i$ of each viewed point $M'_i$ in the plane reference mark O', X' Y' of the image. Each viewed point $M'_i$ corresponds, for example, to a given pixel of the camera 2. In this way, we establish a conversion rule between the coordinates $x'_i$, $y'_i$ of the viewed points $M'_i$ and the coordinates $x_i$, $y_i$ of the points $M_i$. At the end of this flat calibration step, we can then establish a single correspondence between each pixel or viewed point $M'_i$ of the camera 2 and its corresponding point $M_i$, and vice versa. By observing a viewed point $M'_i$, image of a point $M_i$ belonging essentially to the reference plane P, we are able to determine the coordinates $x_i$, $y_i$ of the point $M_i$.

A second curvature calibration step illustrated by FIG. 2 consists of calibrating the image viewed by the camera 2 as a function of a reference surface $C_i$. We use a reference surface $C_i$ made up, for example, of at least one standard curve $C_i$ of which the curvature $1/R_i$ is known, $R_i$ being the radius of curvature. In general, we use a series of standard curves $C_i$ formed, for example, of massive metal pieces, each having a face corresponding to a cylinder segment or a parabola with known curvatures $1/R_i$. These standard curves $C_i$ are obtained, for example, by a process of electroerosion, and their faces can be polished to make them reflective. The standard curves $C_i$ used are chosen to have curvatures $1/R_i$ encompassing the various curvatures expected on the surface to be measured S.

The reference points $M''_i$ of the test image 6 can be brought about by markings, for example, circles whose centers have known coordinates $x''_i$, $y''_i$ in the plane reference mark O'', X'', Y''. The test image 6 can also include a coding of intensity $I_i$ and/or of color, variable from one point to another on its surface. The variation of intensity $I_i$ and/or of color on the surface of the test image 6 can also be defined by a predetermined function along at least axis Y'' of the test image 6, and may correspond, for example, to a sinusoidal function $f_i$. The test image 6 is arbitrarily represented in FIG. 2 by a grid.

A standard curve $C_i$ is placed in the measuring space 1, and the camera 2 is focused on this standard curve $C_i$. With the camera 2 we observe the viewed points $M'_i$, images of the reference points $M''_i$ of the test image 6 after reflection on the standard curve $C_i$ at points $M_i$, and we establish a single correspondence between the variations in the values measured at viewed points $M'_i$ and the known curvature $1/R_i$ of the standard curve $C_i$. The standard curve $C_i$ is shifted into different positions of the measuring space 1, the observation of the image viewed by camera 2 is repeated, and the single correspondence is established. Several standard curves $C_i$ are used, each having a different curvature $1/R_i$, and the observation of the image viewed by the camera 2 and the establishment of the single correspondence is repeated. This step, performed at several points $M_i$ of the reference plane with several different standard curves $1/R_i$, makes it possible to deduce a general law that is valid for every point $M_i$ and for every curve $1/R_i$ in the desired range of curvature. The number of measuring points $M_i$ will be determined as a function of the desired precision for the single correspondence.

In a particular mode of embodiment of the curve calibration, the standard curve $C_i$ is placed in such a way that its generatrix $G_i$ merged with the reference plane P is essentially parallel to the axis Y, and the camera 2 is focused essentially on the standard curve $C_i$. Accordingly, the deduced curve $1/R_i$ will correspond essentially to the curve $1/R_{ix}$ along axis X.

According to a particular embodiment variant of the curve calibration, the test image 6 comprises an intensity coding $I_i$ varying from one point to another of its surface. This variation follows, for example, a sinusoidal function $f_i$ represented on FIG. 2 connecting, in a known manner, the light intensity $I_i$ of each reference point $M''_i$ to its phase $\phi_i$. Using a method such as temporal phase shift, spatial phase shift, or direct phase calculation by the Fourier transform of the image formed by the values measured at the viewed points $M'_i$, we establish a single correspondence between the intensity $I'_i$ observed at viewed points $M'_i$, image of the reference points $M'_i$, with the phase $\phi_i$. In a second step, this operation is carried out, simultaneously or otherwise, for all or part of the viewed points $M''_i$ of the image. In general, this operation is performed on as many viewed points $M'_i$ corresponding to measuring points as there are pixels involved with the standard curve $C_i$.

Between the adjacent viewed points $M'_i$, or nearby pixels, we determine the derivatives of the phase $\phi_i$ essentially along the axis X. A simple method for completing this derivative essentially along axis X consists of diverting along the axis Y' the plane reference mark O', X', Y' linked to the image viewed by the camera 2. This derivative is generally constant over the entire surface of the standard curve $C_i$. Finally, this phase variation $\Delta\phi_i$ obtained is associated with the curve $1/R_{ix}$ along the axis X of the standard curve $C_i$ at point $M_i$. We then place the standard curve $C_i$ at different points of the measuring space 1 so that the variation in $\Delta\phi_i$ in measuring space 1 can be measured at different points.

We then use a second standard curve $C_{i+1}$ (not shown) with curvature $1/R_{i+1}$, also known, with which we repeat these same steps, then possibly with other standard curves having different curvatures, until we are able to establish a general law of the transformation of the phase variation $\Delta\phi_i$ in curvature $1/R_{ix}$, the phase variation $\Delta\phi_i$ being the variation between the phases $\phi_i$ observed by means of the camera 2. This phase variation $\Delta\phi_i$ is calculated between nearby pixels representing nearby points $M_i$ that are offset with respect to each other essentially along the axis X, $1/R_{ix}$ being the corresponding curvature of the standard curve $C_i$ or of the surface to be measured S at point $M_i$ along axis X. This general law of transformation can be expressed by means of a mathematical equation.

At the end of this step, the general law of transformation of the phase variation $\Delta\phi i$ in curvature $1/Rix$ makes it possible, by measuring the phases $\phi i$ then calculating the phase variations $\Delta\phi i$ along axis X at any point Mi of the surface to be measured S situated essentially in the plane P, to know the curvature $1/Rix$ along the axis X in each of these points Mi. This law will be recorded and the assembly parameters will be set to complete the measuring phase.

Figure 3:
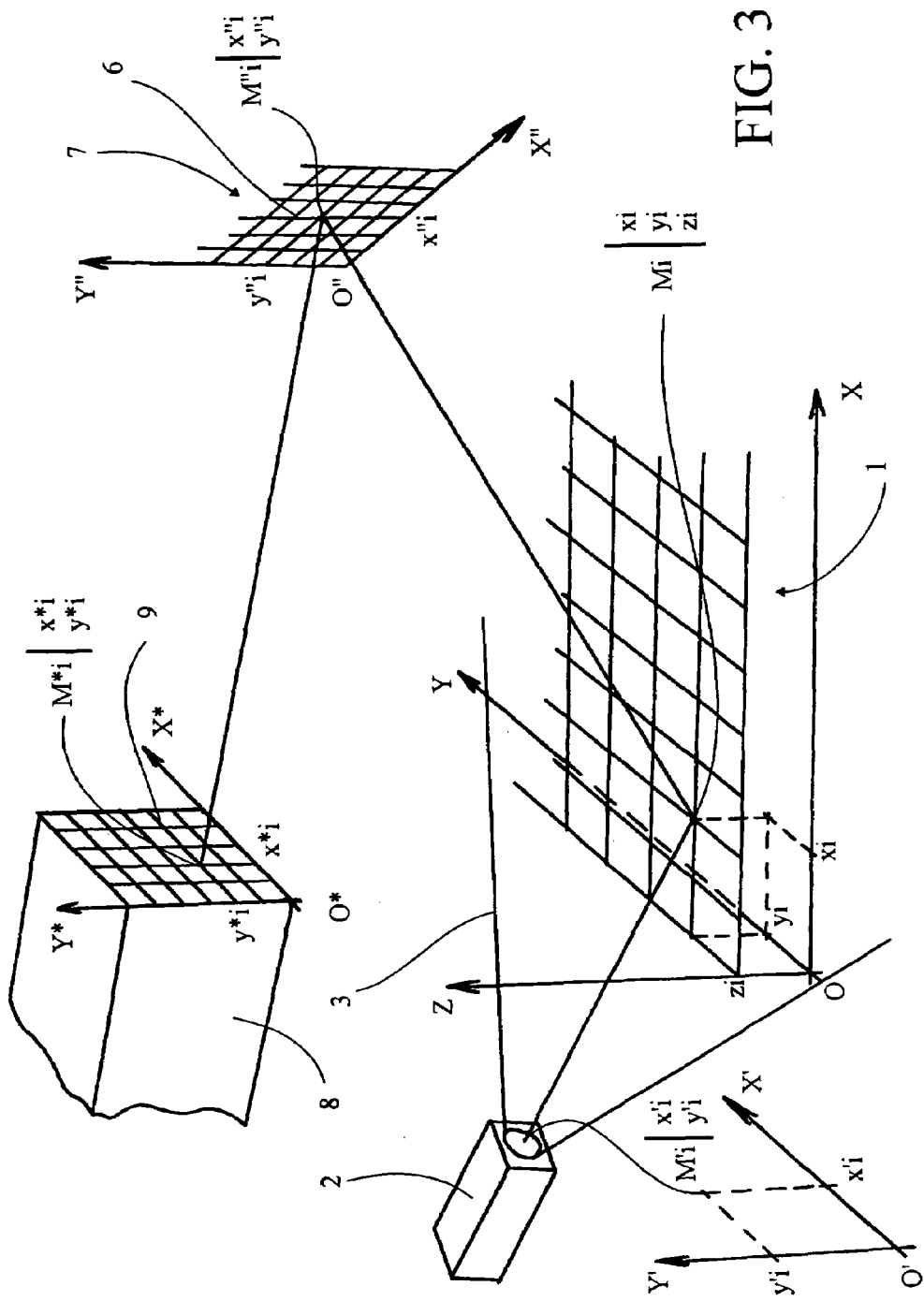
FIG. 3 represents an embodiment variant of a test image used to accomplish the curved calibration phase or the curved measuring phase, FIG. 4 schematically represents the configuration of the measuring device to accomplish the sloped calibration phase, and FIG. 5 schematically represents the configuration of the measuring device to accomplish the sloped measuring phase.

In another embodiment variation, the test image 6 can be obtained as illustrated by FIG. 3, by projection of at least one projection device 8 of a test image 9 on an intermediate plane 7. The reference points M*i of the test image 9 are thereby projected to points M"i of the test image 6 and, after reflection at points Mi of the surface to be measured S, they are observed in the image of camera 2 at viewed points M'i or pixels.

The curvature calibration phase is followed by the phase of measuring in curvature of the optically reflective surface to be measured S. The surface to be measured S is placed in the space to be measured 1, with the camera 2 we observe the viewed points M'i image of the reference points M"i of the test image 6 after reflection on the surface to be measured S at points Mi, and from this we deduce the curvature $1/Ri$ at points Mi of the surface to be measured S as a function of the law or laws of single correspondence resulting from the previous curvature calibration phase or phases.

Figure 4:
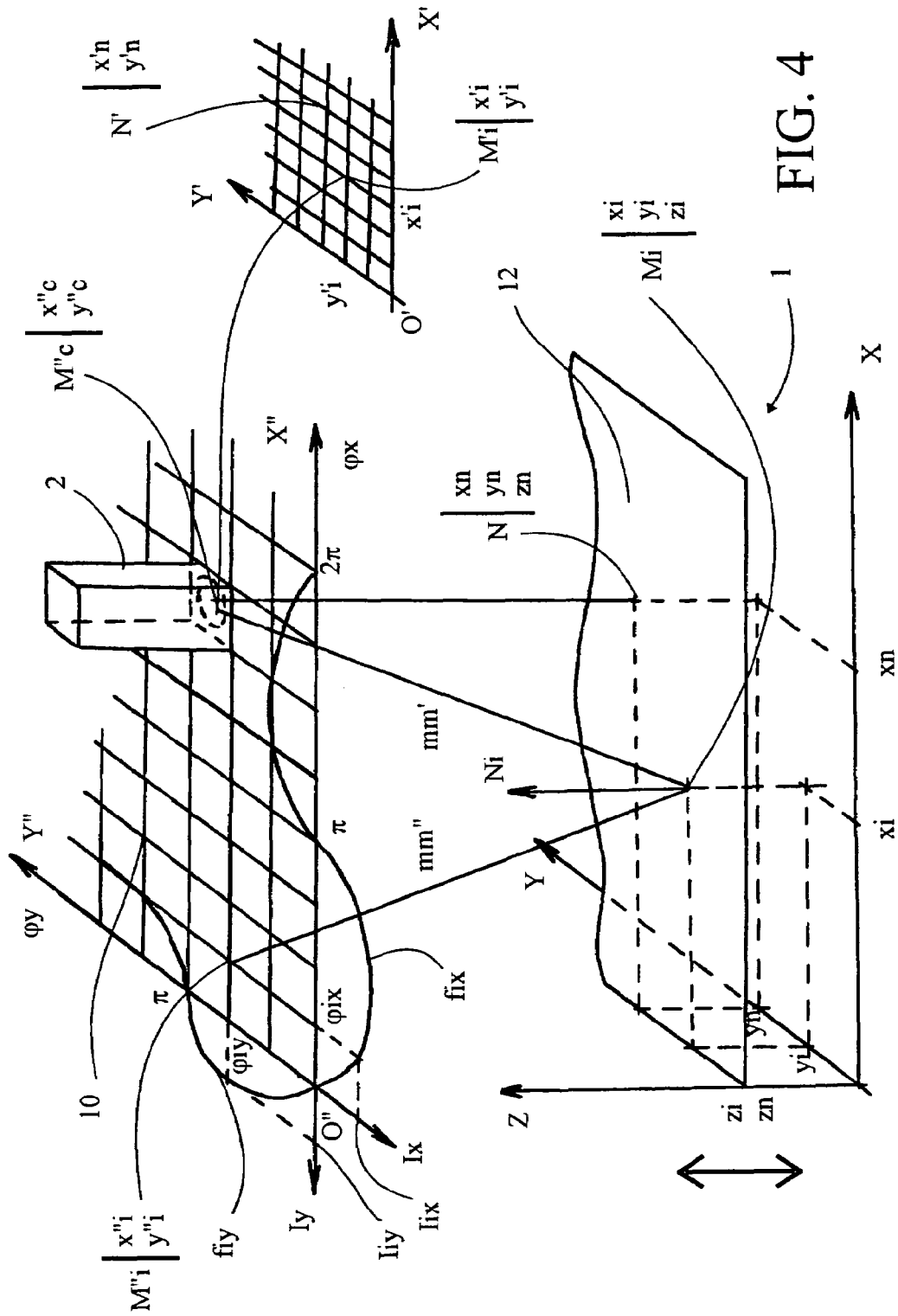

In a second method of calibration called sloped calibration, which is particularly suited for measuring the geometric magnitudes of a large optically reflective surface to be measured S situated in the measuring space 1, as illustrated by FIG. 4, there is an essentially plane test image 10 and a plane reference mark O", X", Y", essentially opposite the measuring space 1 and the camera 2, so that its optical center is disposed essentially in the vicinity of the test image 10. The test image 10 may also comprise patterns calibrated at the beginning, or require a calibrating operation as in the preceding example. This test image 10 may comprise, like test image 6, a coding of different intensities of the same color or a coding of different colors. As a reference surface, we use at least one reference plane P essentially parallel to the test image 10 and known coordinate plane along the axis Z. This reference plane P is, for example, an essentially flat mirror 12 with known coordinate zi along axis Z.

As in the case of the curvature calibration, the first step of the slope calibration illustrated by FIG. 4 consists of performing a calibration of the plane to establish a single correspondence between the coordinates of the points Mi in the spatial reference mark O, X, Y, Z, and of which the coordinate along axis Z is known, and the coordinates of the viewed points M'i in the plane reference mark O', X', Y'. In the case of the sloped calibration, this step is indispensable.

To establish this single correspondence, as for the curve calibration, the camera 2 is used to observe the viewed points M'i, images of the reference points M"i of the test image 10 after reflection on the mirror 12 at points Mi. Knowing the coordinates of the reference points M"i and of the point M"c, M"c being the optical center of the lens of camera 2, and of coordinates x"c, y"c, it is determined by applying the laws of the reflection of coordinates of point Mi. In fact, it is known that the coordinates xi, yi along axes X, Y of Mi are equal to half the sums of the coordinates x"c, x"i along axis X and y"c, y"i along axis Y. In this way, we determine the coordinates xi, yi of Mi for which zi is already known. The coordinates x"c, y"c are measured or determined empirically, by writing, for example, that the points Mc, M'c, and M"c are aligned, with M'c being the image of Mc after reflection on the mirror 12 in Mc, and/or that the measurement at M'c is independent of zc.

A second step of slope calibration also illustrated by FIG. 4 consists of calibrating the axis Z. To accomplish this second step, we shift the mirror 12 forming the reference plane P parallel to itself in different known coordinates zi of the measuring space 1, and we repeat the observation of the image viewed with the camera 2 and establishment of the single correspondence for the different coordinates zi along the axis Z. In this way we measure, for each position of the mirror 12, the coordinates x'i and y'i of the viewed point M'i, image of the reference point M"i after reflection on the mirror 12, from which we deduce the coordinates xi, yi of point Mi of the mirror 12 of the coordinate zi along axis Z. In this way, we obtain the single correspondence between the coordinates x'i, y'i of the viewed point M'i and the coordinates xi, yi of point Mi for each coordinate zi, this single correspondence being valid for any point Mi observed by the camera 2 at the viewed point M'i or pixel. This single correspondence is theoretically linear, and for this reason requires only two measurements to be established. However, because of aberrations, this single correspondence is most often nonlinear, and requires more measuring points in proportion as it is expected to be faithful to reality.

In a particular embodiment variant, the test image 10 comprises a coding of light intensities Iix and Iiy, respectively, along the axes X", Y", these intensities varying from one point to another on the surface. For example, these variations are brought about by means of two sinusoidal functions fix and fiy. In a known manner, the function fix connects the light intensity Iix along the axis X" and x"i, for example by means of the phase Qix if Iix is modulated sinusoidally along the zis X". The function fiy in a known manner connects the light intensity Iiy along the axis Y" and y"i, for example by means of the phase $\phi$iy if Iiy is modulated sinusoidally along axis Y. These sinusoidal functions fix, fiy may be present simultaneously or successively on the test image 10.

To accomplish the first two steps of sloped calibration of this embodiment variant, with camera 2 we observed the viewed points M'i image of the points M"i after reflection at points Mi, and a single correspondence is established between the intensity I'i of the viewed points M'i and the coordinate zi of the mirror 12, on the one hand, and the coordinates xi, yi of points Mi, on the other hand. By a method such as temporal phase shift, spatial phase shift, or direct calculation of the phase by means of the Fourrier transform of the image of intensities I'ix, I'iy if the intensities Iix, Iiy are modulated sinusoidally, or by any other method, the observed intensities I'ix, I'iy are connected with the coordinates xi" yi". Therefore, we know the coordinates x"i, y"i of the reference point M"i of the test image 10, whose image is observed at the viewed point M'i or pixel after reflection of the point Mi of the surface to be measured S. The next part of the sloped calibration phase can be accomplished as indicated above.

Figure 5:
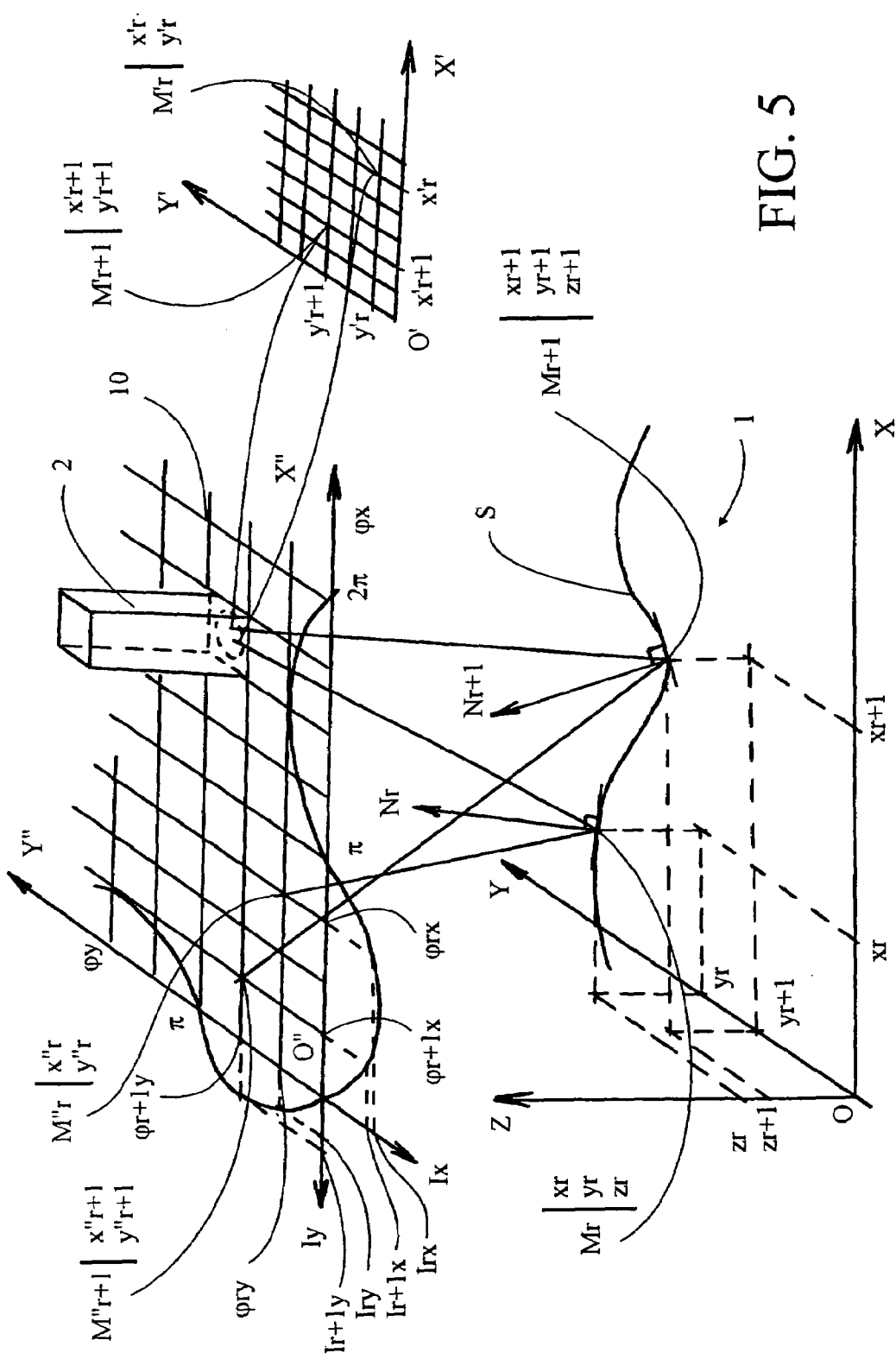

The sloped calibration phase is followed by the slope measuring phase of the optically reflective surface to be measured S illustrated by FIG. 5.

In a first step, we place in the measuring space 1 the optically reflective surface to be measured S, of which we know at least the coordinate zr along axis Z of at least one point Mr. This point Mr corresponds, for example, to a mechanical abutment or to any point on the surface to be measured S whose coordinate zr is known and measured separately, for example, by means of a sensor. The camera 2 is used to observe the viewed point M'r, image of the reference point M"r of the test image 10 after reflection on the surface S at point Mr. By locating the point Mr, for example by a visual means, we observe the coordinates x'r, y'r of the corresponding viewed point M'r. Knowing the coordinate zr along axis Z, using the preceding single correspondence, we can deduce from it the coordinates xr, yr of point Mr in the special reference mark O, X, Y, Z.

In a second step, we determine the normal vector Nr at point Mr. According to the laws of the reflection and with reference to FIG. 4, we know that if M"i is the reference point belonging to the test image 10, Mi is the corresponding point on the surface to be measured S, and M"c is the optical center of the lens of camera 2, mm" is the unit vector that is colinear to MiM"i, mm' is the unit vector that is colinear to MiM"c, Ni is the normal vector at the surface of point Mi, vectors mm", mm', and Ni are linked by the relation mm"+mm'=k×Ni, in which k is a scalar magnitude. Therefore, to define the normal vector Nr at point Mr, we apply this same relation which is then written mrmr"+mrmr'=k. Nr with Mr" reference point of the test image 10, whose image is the viewed point Mr' formed after reflection on the surface to be measured S at point Mr, of which we know the coordinate zr along the axis Z, mrmr" the unit vector colinear with MrM"r, mrmr' the unit vector colinear with MrM"c. Transposed on the axes X, Y, Z, this relation yields a system of equations making it possible to determine the normal vector Nr in Mr on the surface to be measured S, and therefore the slopes Prx, Pry along the axes X and Y at this point.

In a third step, we consider a point Mr+1 near Mr, of which we decide temporarily and arbitrarily that the theoretical coordinate zr+1th along axis Z is approximately equal to zr. We observe the coordinates x'r+1, y'r+1 of the viewed point M'r+1 image of Mr+1 of the surface to be measured S. Knowing x'r, y'r and the coordinate zr+1th by means of the previous calibration, we determine the coordinates xr+1, yr+1 of the point Mr+1. We measure the intensities I'ix and I'iy, of which we determine the coordinates x"r+1 and y"r+1 of the reference point M"r+1 of the test image 10. Knowing the coordinates xr+1, yr+1, and zr+1th of Mr+1, the coordinates x"r+1 and y"r+1 of M"r+1, and the coordinates of point C, by solving the system of equations described above, we determine the normal vector Nr+1 at point Mr+1 on the surface to be measured S.

Knowing Mr and Nr+1, knowing xr+1 and yr+1, and being aware that Nr+1 is orthogonal to MrMr+1, we determine the true coordinate zr+1 by posting that the scalar product MrMr+1 by Nr+1 is equal to zero, which yields an equation in which the unknown is zr+1. The slopes Pr+1x, Pr+1y are calculated directly from Nr+1 by means of the following ratios: Pr+1x=Nr+1x/Nr+1z and Pr+1y=Nr+1y/Nr+1z in which Pr+1x and Pr+1y are, respectively, the slopes along the axes X and Y at point Mr+1, Nrx, Nry and Nrz are projections, respectively along axes X, Y, and Z of vector Nr.

We can then perform an iterative calculation to refine the results and increase the precision of the coordinate zr+1.

By repeating this measuring phase from one point to the next, for each point of the surface to be measured S, we define the whole of the slopes Pix, Piy along the axes X and Y, and the whole of the coordinates xi, yi, zi of the points Mi viewed at points M'i by the camera 2. The slopes Pix, Piy of any point intermediate to two measured points can be obtained by interpolation of the slopes of the nearby points measured. In this way, at any point Mi of the surface to be measured S, we can determine the slopes Pix, Piy along axes X, Y respectively.

The measuring device according to the invention which permits the use of the process for measuring at least one geometric magnitude of an optically reflective surface to be measured S described above includes, in particular, at least one measuring space 1 in which we place at least one reference surface P, Ci, or surface to be measured S, at least one test image 6, 10 positioned to reflect on the reference surface P, Ci, or surface to be measured S, and at least one camera 2 position so that its field of view 3 covers the measuring space 1 and sees the reflection of the test image 6, 10 on the reference surface P, Ci or surface to be measured S. The camera 2 is associated with a computer system (not shown) designed to interpret the image of the optically reflective surface to be measured S viewed by the camera 2 and to deduce from it the quantitative values characterizing at least one geometric magnitude of the surface to be measured S as a function of at least one reference surface P, Ci, with a photograph from camera 2 permitting visualization of all the points of the surface to be measured S.

POSSIBILITIES FOR INDUSTRIAL APPLICATION

This description clearly shows that the process according to this invention permits the calibrated measuring device to measure once rapidly and accurately one or more geometric magnitudes of large optically reflective surfaces by determining, depending on the method used, the curvature of a point on the surface to be measured or the slope at each point of the optically reflective surface to be measured and the position in the measuring space of each of these points.

This invention is not limited to the embodiment examples described, but extends to any modification and variant that are apparent to a person skilled in the art, while remaining within the protection defined in the attached claims.

The invention claimed is:

1. A method of measuring at least one geometric dimension of an optically reflective surface to be measured (S), the method comprising the steps of:
    coupling a computer to a camera;
    defining a measurement space;
    associating a spatial reference mark (O, X, Y, Z) with said measurement space;
    performing a calibration phase comprising the steps of:
        performing a flat calibration by establishing a unique correspondence between coordinates (x', y') of a plurality of viewed first reference points (M'i) and coordinates (x, y) of a plurality of third reference points (Mi) having a known Z axis coordinate;
        performing a slope calibration comprising the steps of:
            positioning a test image and said camera across from said measurement space, the optical center of said camera disposed in a vicinity of said test image;
            arranging at least one reference surface (P,Ci) consisting of a mirror and having a known coordinate (zi) on said Z axis parallel to said test image for use as a reference surface;
            associating a first plane reference mark (O', X', Y') with an image of said reference surface (P,Ci) such that said image of said reference surface (P,Ci) is observed in the field of vision of said camera;
            associating said test image comprising second reference points (M"i) with a second plane reference mark (O", X", Y") in such a way that said second reference points (M"i) are reflected on said reference surface (P, Ci), at said third reference points (Mi);
            reflecting an image of said viewed first reference points (M'i) of said second reference points (M"i) of said test image onto said reference surface (P,Ci) at said third reference points (Mi);
            using said camera to observe said viewed first reference points (M'i) image of said second reference points (M"i) on said test image after reflection on said reference surface (P,Ci) at said third reference points (Mi);

establishing a unique correspondence between said coordinates (x', y') of said viewed first reference points (M'i) and said coordinates (x, y) of said third reference points (Mi) having a Z axis coordinate along said Z axis;

a measurement phase comprising the steps of:

disposing at least one optically reflective reference surface (S) to be measured in said measurement space;

arranging said camera such that said measurement space and said optically reflective surface (S) to be measured is observable with a field of vision of said camera;

reflecting said viewed first reference points (M'i) of said second reference points (M"i) onto said surface to be measure (S) at said third reference points (Mi);

using said camera to observe an image of said optically reflective surface (S) to be measured after said viewed first reference points (M'i) of said second reference points (M"i) have been reflected onto said optically reflective surface (S) to be measured at said third reference points (Mi);

establishing a unique correspondence between said viewed first reference points (M'i) and said second reference points (M"i) for a multitude of points forming said optically reflective surface (S) to be measured; and using said computer to interpret said image by transforming said image into quantitative values characterizing a multitude of points forming said optically reflective surface (S) to be measured and comprising at least one of the geometric dimensions selected from the group comprising at least slope, curvature, and position in space.

2. The method according to claim 1 further comprising the step of:

displacing said mirror forming said reference surface (P,Ci) such that said mirror is parallel to itself at a different coordinates (zi) of said measurement space, wherein observation of said image seen through said camera and establishment of said unique correspondence are repeated.

3. The method according to claim 1 further comprising the step of:

measuring a slope of said optically reflective surface (S) at a multitude of points, wherein coordinates (xi, yi, zi) at said third reference points (Mi) are deduced as a function of laws of unique correspondence resulting from said calibration phases and a first and a second slope (Pix, Piy), respectively, along an X axis and a Y axis at said third reference points (Mi).

4. The method according to claim 2, further comprising the step of:

measuring a slope of said optically reflective surface (S) at a multitude of points, wherein coordinates (xi, yi, zi) at said third reference points (Mi) are deduced as a function of laws of unique correspondence resulting from said calibration phases and a first and a second slope (Pix, Piy), respectively, along a X axis and a Y axis at said third reference points (Mi).

5. The method according to claim 1 further comprising the steps of:

establishing unique correspondences between said coordinates (xi, yi) of said third reference points (Mi), said coordinate (zi) of said reference surface (P,Ci), and at least one of intensities measured (I'ix, I'iy), colors measured, or their variations, at said viewed first reference points (M'i), wherein a coding of intensities (Iix, Iix) and/or a variation of a color is disposed on said test image (10) such that said coding of intensities (Iix, Iix) and/or of said variation of said color is defined by known functions along a X" axis and a Y" axis on said test image (10), respectively.

6. The method according to claim 1, wherein said calibration phase further comprises a calibrating on a curve phase comprising the steps of:

using a reference surface (P, Ci) comprising at least a standard curve (Ci) as a reference comprising at least a known curvature (I/Ri) along said X and Y axes;

arranging said camera so said a field of vision, relative to said reference surface (P, Ci) is level;

situating said test image opposite said camera relative to said reference surface (P,Ci) and said camera;

observing, with said camera, said viewed first reference points (M'i) image of said second reference points (M"i) of said test image after reflection on said standard curve (Ci) at third reference points (Mi); and establishing a unique correspondence between a plurality of measured values, or a variation of said measured values, at said viewed first reference points (M'i) and said known curvature (I/Ri) of said standard curve (Ci) for calibrating on a curve.

7. The method according to claim 6 further comprising the step of:

establishing a unique correspondence between a variation in intensity (I'i) measured and/or a color measured or a variation of a color spectrum at said viewed first reference points (M'i) and said known curvature (I/Ri) of said standard curve (Ci), wherein said test image comprises a coding of intensity (Ii) and/or of said color varying from one point to another on its surface and said variation in said intensity (I'i) measured and/or said color measured or said variation of said color spectrum is defined by a known function along at least said X" axis or said Y" axis of said test image.

8. The method according to claim 6, further comprising the step of displacing said standard curve (Ci), forming said reference surface, at different positions in said measurement space, wherein observing said viewed first reference points (M'i) image of said second reference points (M"l) of said test after reflection on said standard curve (Ci) at third reference points (Mi) with said camera and establishing a unique correspondence between a plurality of measured values or a variation of said measured values at said viewed first reference points (M'i) and said known curvature (I/Ri) of said standard curve (Ci) are repeated.

9. The method according to claim 6 further comprising the step of:

repeating said steps of calibrating on a curve for a plurality of standard curves (Ci) where each of said standard curves has a corresponding known curvature (I/Ri).

10. The method according to claim 6 further comprising the step of measuring a curve of said optically reflective surface to be measured (S) at a multitude of points by deducing said known curvature (I/Ri) at said third reference points (Mi) as a function of the laws of unique correspondence resulting from said calibrating on a curve phase.

11. The method according to claim 7 further comprising the step of measuring a curve of said optically reflective surface to be measured (S) at a multitude of points by deducing said known curvature (I/Ri) at said third reference points (Mi) as a function of the laws of unique correspondence resulting from said calibrating on a curve phase.

12. The method according to claim 8 further comprising the step of measuring a curve of said optically reflective surface to be measured (S) at a multitude of points by deducing said known curvature (I/Ri) at said third reference points (Mi) as a function of the laws of unique correspondence resulting from said calibrating on a curve phase.

13. The method according to claim 9 further comprising the step of measuring a curve of said optically reflective surface to be measured (S) at a multitude of points by deducing said known curvature (I/Ri) at said third reference points (Mi) as a function of the laws of unique correspondence resulting from said calibrating on a curve phase.

14. A process for measuring at least one geometric magnitude of a specular reflective surface, the process comprising the steps of:
coupling a camera with a computer;
creating a calibration system comprising the steps of:
defining a measuring space in which there is at least one reference surface (P, Ci), wherein the reference surface includes at least a standard curve (Ci) having at least a known curvature (I/Ri) along a first X axis and a first Y axis (X, Y);
associating an orthonormed spatial third reference mark (O, X, Y, Z) with said measuring space;
positioning said camera such that a test image is situated opposite said camera with respect to said reference surface (P, Ci), the field of view of said camera covers said measuring space and said reference surface (P, Ci), and said field of view of said camera is oblique with respect to said reference surface (P, Ci);
focusing said camera on said reference surface (P, Ci);
associating a first plane reference mark (0', X', Y') with an image of said reference surface (P, Ci);
associating said test image with a second plane reference mark (0", X", Y") which comprises a plurality of second reference points (M"i), so that said second reference points (M"i) are reflected on said reference surface (P, Ci) at a plurality of third reference points (Mi);
using said camera to view first reference points (M'i) of said second reference points (M"i) of said test image after reflection on said reference surface (P, Ci) at said third reference points (Mi);
establishing a single correspondence between said viewed first reference points (M'i) and said second reference points (M"i);
establishing a single correspondence between a measured value at said viewed first reference point (M'i) and said known curvature (1/Ri) of said standard curve (Ci);
placing said specular reflective surface in said measuring space;
illuminating the specular reflective surface with said test image projected along an angle of incidence;
reflecting the test image off the specular reflective surface along an angle of reflection;
aligning a camera along the angle of reflection, said field of view of said camera covers said measuring space and said specular reflective surface;
focusing said camera on said specular reflective surface;
using said camera to view first reference points (M'i) image of said second reference points (M"i) of said test image, after reflection on said specular reflective surface at said third reference points (Mi);
establishing a single correspondence between said viewed first reference points (M'i) and said second reference points (M"i); and
using said computer to transform said test image reflected by the specular reflective surface and viewed by said camera into quantitative values using the calibration system.

15. The process according to claim 13, further comprising the steps of:
coding said test image for at least one of an intensity (Ii) and for color that varies from one point of the reference surface to another, the variation being defined by a known function along at least a second X axis and a second Y axis (X", Y") of said test image; and
establishing a single correspondence between at least one of a value in intensity (I'i) measured and a value in color measured at each viewed first reference points (M'i), and said known curvature (I/Ri) of said standard curve (Ci).

16. The process according to claim 14, further comprising the step of:
shifting said standard curve (Ci), forming said reference surface, in different positions of said measuring space, wherein the observation of said test image viewed by said camera is repeated, and said single correspondence is established in a number of third reference points (Mi) determined as a function of the desired precision for said single correspondence.

17. The process according to claim 14, further comprising the step of using several standard curves (Ci) which each comprise a corresponding known curvature (I/Ri).

18. The process according to claim 14, further comprising the step of deducing the curvature (1/Ri) of said specular reflective surface at said third reference points (Mi) as a function of the laws of single correspondence resulting from said calibration system.

* * * * *